United States Patent
Kanbe et al.

(10) Patent No.: US 10,658,899 B2
(45) Date of Patent: May 19, 2020

(54) YOKE HOUSING, MOTOR, AND METHOD FOR MANUFACTURING YOKE HOUSING

(71) Applicant: Asmo Co., Ltd., Shizuoka-ken (JP)

(72) Inventors: Yousuke Kanbe, Toyohashi (JP); Tsuyoshi Matsuda, Hamamatsu (JP)

(73) Assignee: Denso Corporation, Kariya (JP)

( * ) Notice: Subject to any disclaimer, the term of this patent is extended or adjusted under 35 U.S.C. 154(b) by 222 days.

(21) Appl. No.: 15/804,681

(22) Filed: Nov. 6, 2017

(65) Prior Publication Data
US 2018/0062475 A1 Mar. 1, 2018

Related U.S. Application Data

(62) Division of application No. 14/453,123, filed on Aug. 6, 2014, now Pat. No. 9,831,737.

(30) Foreign Application Priority Data

Aug. 12, 2013 (JP) ................. 2013-167702

(51) Int. Cl.
*H02K 5/04* (2006.01)
*B21D 35/00* (2006.01)
(Continued)

(52) U.S. Cl.
CPC ............... *H02K 5/04* (2013.01); *B21D 22/20* (2013.01); *B21D 35/006* (2013.01); *B21D 51/16* (2013.01); *H02K 7/1166* (2013.01)

(58) Field of Classification Search
CPC ...... B21D 22/00; B21D 22/04; B21D 22/025; B21D 22/20-22; B21D 22/24;
(Continued)

(56) References Cited

U.S. PATENT DOCUMENTS

| 5,426,337 A | 6/1995 | Kobayashi et al. |
| 5,901,599 A * | 5/1999 | Sato .................. B21D 24/04 |
| | | 72/350 |

(Continued)

FOREIGN PATENT DOCUMENTS

| CN | 102130535 A | 7/2011 |
| CN | 102594012 A | 7/2012 |

(Continued)

OTHER PUBLICATIONS

Translation: Branstaedter—DE-4109873-A1, Translated Jan. 2020 (Year: 1991).*

(Continued)

*Primary Examiner* — Adam J Eiseman
*Assistant Examiner* — Matthew Kresse
(74) *Attorney, Agent, or Firm* — Patterson Thuente Pedersen, P.A.

(57) ABSTRACT

A yoke housing includes a tubular case and a flange. The tubular case is formed from a metal sheet in a drawing process. The flange is formed at an end of the tubular case. The flange has a width in the lateral direction that is equal to the outer diameter of the tubular case. The flange has a base including beads and a thick portion. Each of the beads is formed by compressing the base. A portion of the base in which the beads are not formed defines a thick portion. The thick portion is located at a middle portion of the flange in the lateral direction. The beads are located on opposite sides of the thick portion in the lateral direction.

1 Claim, 7 Drawing Sheets

(51) Int. Cl.
  *H02K 7/116* (2006.01)
  *B21D 22/20* (2006.01)
  *B21D 51/16* (2006.01)

(58) Field of Classification Search
  CPC ...... B21D 22/28; B21D 22/30; B21D 22/105; B21D 22/125; B21D 22/225; B21D 24/005; B21D 53/84; B21D 53/88; B21D 51/16; B21D 31/02; B21D 35/00; B21D 35/001; B21D 35/006; B21D 19/00; B21D 19/043; H02K 5/04; H02K 7/116; H02K 7/1166
  USPC .......................................... 72/379.2, 370.11
  See application file for complete search history.

(56) References Cited

U.S. PATENT DOCUMENTS

| | | |
|---|---|---|
| 2002/0047381 A1 | 4/2002 | Torii |
| 2004/0135446 A1 | 7/2004 | Yamamoto |
| 2007/0046121 A1 | 3/2007 | Miura |
| 2009/0261693 A1 | 10/2009 | Debrailly |
| 2012/0161560 A1 | 6/2012 | Mizutani |

FOREIGN PATENT DOCUMENTS

| | | | |
|---|---|---|---|
| DE | 4109873 A1 * | 3/1991 | ............ B21D 51/16 |
| DE | 4106672 A1 | 9/1992 | |
| JP | 2004-336960 A | 11/2004 | |
| JP | 2011091887 | 5/2011 | |

OTHER PUBLICATIONS

Chinese Office Action for Application No. 201410389539.0, dated Sep. 4, 2017, (Office Action 6 pgs., English Translation 5 pgs., 11 pgs. total).

* cited by examiner

Lateral Direction of Flange

YOKE HOUSING, MOTOR, AND METHOD FOR MANUFACTURING YOKE HOUSING

RELATED APPLICATION

This application is a division of application Ser. No. 14/453,123 filed Aug. 6, 2014, entitled "Yoke Housing, Motor, and Method for Manufacturing Yoke Housing" and claims the benefit of Japanese Patent Application No. 2013-167702, filed Aug. 12, 2013, each of which is hereby fully incorporated herein by reference.

FIELD OF THE INVENTION

The present invention relates to a motor yoke housing.

BACKGROUND OF THE INVENTION

Japanese Laid-Open Patent Publication No. 2011-91887 describes an example of a motor yoke housing including a tubular case and a fastening flange. The tubular case includes a closed end and an open end, and the fastening flange is formed on the open end of the tubular case. A field magnet and an armature are arranged in the tubular case. A drawing process is performed to form the yoke housing from a metal sheet. Then, a pressing process is performed to press out the flange from the metal sheet.

A motor used in, for example, a power window device of a vehicle, needs to be thin (narrow) in a direction orthogonal to the axis of the motor due to the limitation in the available space. As shown in FIG. 11A, a yoke housing 101 may use a flange 102 that is narrowed, or generally rectangular, as viewed in the axial direction to reduce the size of the motor in the direction orthogonal to the motor axis. Further, as shown in FIG. 11A, to reduce the size of the motor, it is desirable that the length of the short sides of the flange 102 be equal to the outer diameter of a tubular case 103. In other words, it is desirable that the long sides of the flange 102 arranged on the outer circumferential surface of the tubular case 103 as viewed in the axial direction.

As shown in FIG. 11A, when the length of the short sides of the flange 102 is equal to the outer diameter of the tubular case 103, there is an interval between the outer circumferential surface of the tubular case 103 and each longitudinal edge of the flange 102. However, there is no interval between the outer circumferential surface of the tubular case 103 and the each lateral edge of the flange 102. Thus, when manufacturing the yoke housing 101, the removal of the flange 102 from a metal sheet 104 during a pressing process results in residual stress, which was generated when drawing the tubular case 103, acting in the lateral direction in which the flange 102 does not extend. Consequently, as shown in FIG. 11B, the open end of the tubular case 103 may deform so as to widen in the lateral direction of the flange 102.

SUMMARY OF THE INVENTION

It is an object of embodiments of the present invention to provide a yoke housing, a motor, and a method for manufacturing a yoke housing that limits deformation of the yoke housing, which includes a tubular case and a narrow flange.

One object of embodiments of the present invention is a yoke housing including a tubular case formed from a metal sheet in a drawing process. The tubular case includes a first end in an axial direction. A flange is formed on the first end and bent from the tubular case. The flange has a narrow shape and extends in a longitudinal direction, a lateral direction, and a thickness direction. The flange has a width in the lateral direction that is equal to an outer diameter of the tubular case. The flange includes a base located proximal to an outer circumferential surface of the tubular case. The base includes beads and a thick portion. Each of the beads is formed by compressing the base in the thickness direction. The thick portion is defined in a portion of the base in which the beads are not formed. The thick portion is thicker than the beads. The thick portion is located at a middle portion of the flange in the lateral direction. The beads are located on opposite sides of the thick portion in the lateral direction.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

Figure 1:
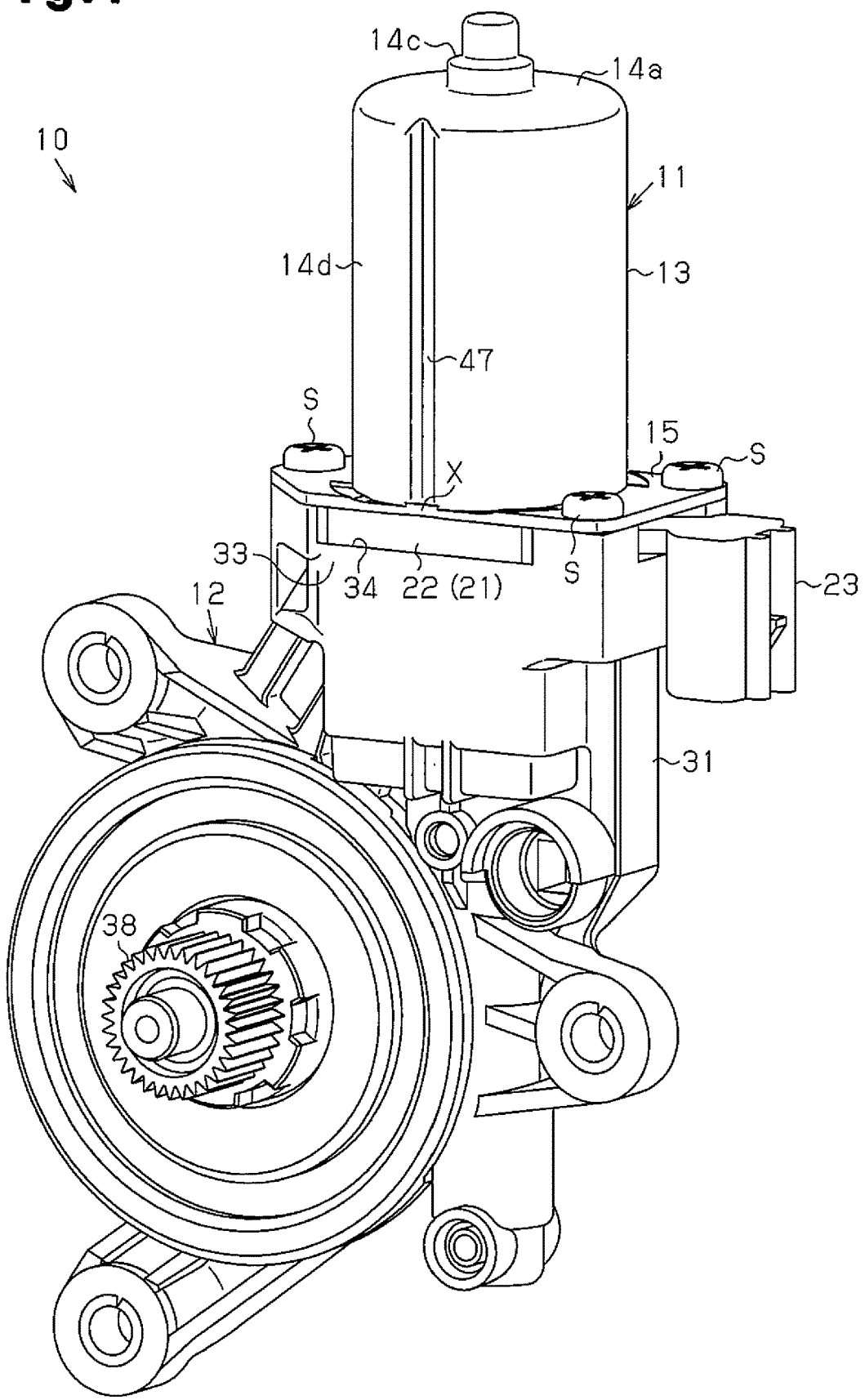
FIG. 1 is a perspective view of a motor according to one embodiment of the present invention.

FIG. 1 depicts an embodiment of a motor 10. The motor 10 is used as a drive source for a power window device that raises and lowers a vehicle window glass with electric power. The motor 10 includes a motor body 11 and a speed reduction unit 12. The motor body 11 generates rotation force and is located in an upper portion of the motor 10 as viewed in FIG. 1. The speed reduction unit 12 is located at the output side of the motor body 11 (lower side of motor body 11 as viewed in FIG. 1).

Figure 2:
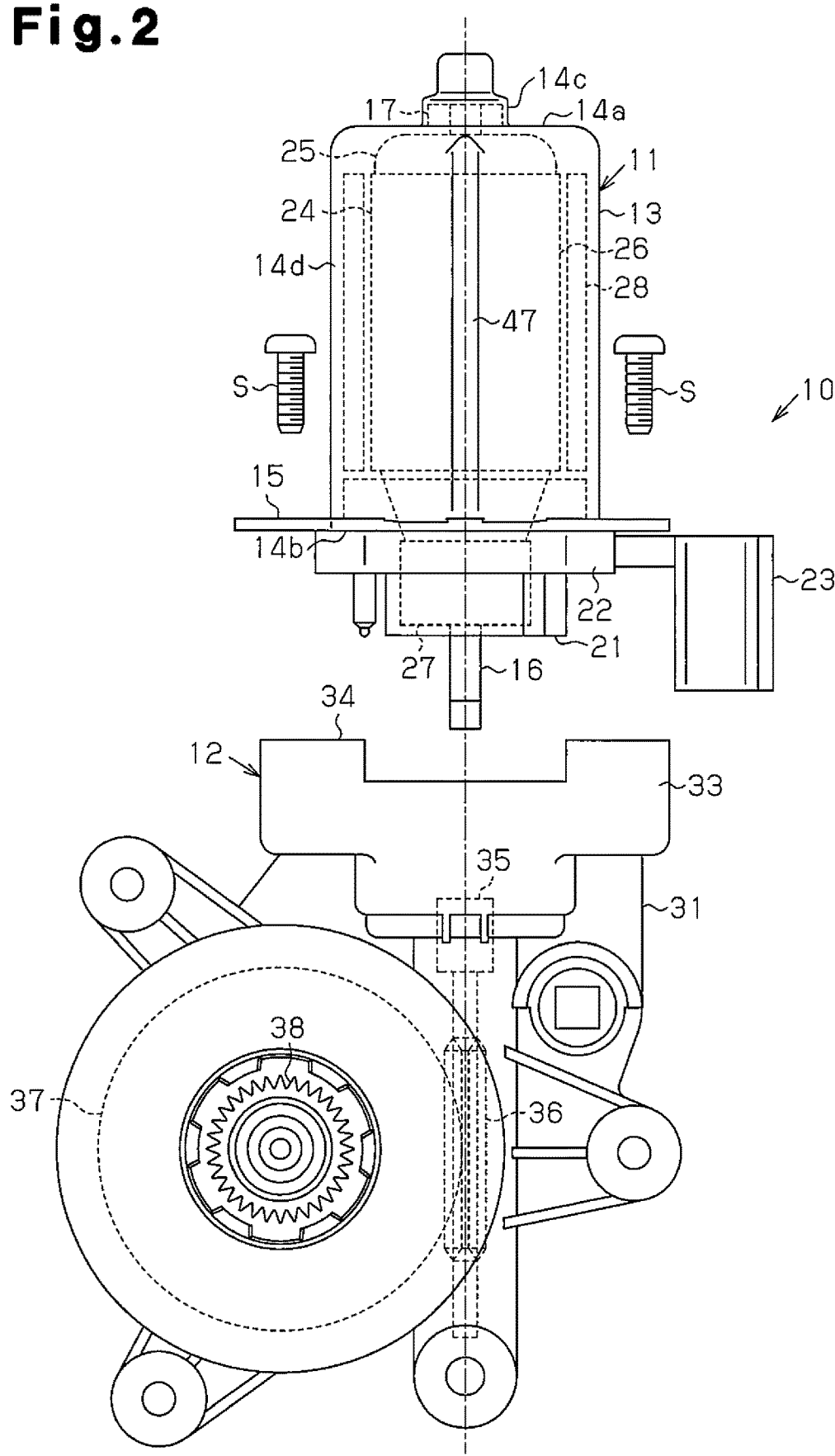
FIG. 2 is an exploded front view of the motor shown in FIG. 1.

As depicted in FIGS. 1 and 2, the motor body 11 has a yoke housing 13 (hereafter referred to as "the yoke 13"), which includes a tubular case 14 and a flange 15. The tubular case 14 includes a first end and a second end in the axial direction. The flange 15 is formed on the first end of the tubular case 14. The second end (upper end as viewed in FIG. 1) of the tubular case 14 is closed by an end wall 14a. The end wall 14a includes a central portion that defines a bearing receptacle 14c, which is tubular, has a closed end, and extends toward the outer side in the axial direction. A bearing 17 is fixed in the bearing receptacle 14c to support a rotation shaft 16. Further, the flange 15 is planar and extends in a direction orthogonal to the axis of the tubular case 14. The axis of the tubular case 14 coincides with the axis of the rotation shaft 16. Further, the flange 15 extends at a right angle to an outer circumferential wall 14d of the tubular case 14.

As depicted in FIG. 2, a brush holder 21, which is formed from an insulative resin material, is attached to the open end 14b. The brush holder 21 holds a power supplying brush (not shown). A sealing member 22, which is formed from an elastomer, is arranged on the circumferential edge of the brush holder 21 to seal the open end 14b. A portion of the brush holder 21 is fitted into the tubular case 14 of the yoke 13. Further, the brush holder 21 includes connector 23 used for external connections. The connector 23 extends from the brush holder 21 in the radial direction.

A rotor 24 (armature) is arranged in the tubular case 14. The rotor 24 includes a winding 25, an armature core 26, and a rectifier 27. The winding 25 is wound around the armature core 26. The armature core 26 and the rectifier 27 are fixed to the rotation shaft 16. The rotation shaft 16 is supported by the bearing 17 in the yoke 13 and a bearing (not shown) in the brush holder 21. The armature core 26 and the winding 25 are arranged in the inner side of a field magnet 28, which is fixed to the inner circumferential surface of the tubular case 14. The rectifier 27 is fixed to a portion of the rotation shaft 16 projecting out of the yoke 13. In other words, the rectifier 27 is arranged in the brush holder 21, which is located at the outer side tubular case 14. Further, the rectifier 27 is configured to contact the power supplying brush (not shown), which is held in the brush holder 21.

The speed reduction unit 12 includes a gear housing 31 and a speed reduction mechanism, which is accommodated in the gear housing 31. The gear housing 31 is formed from resin and fixed to the yoke 13.

The gear housing 31 includes a holder receptacle 33 and a yoke fastening portion 34. The holder receptacle 33 receives a portion of the brush holder 21. The yoke fastening portion 34 is fastened to the flange 15 of the yoke 13. The yoke fastening portion 34 has an outer shape that is identical to that of the flange 15 as viewed in the axial direction. The rectifier 27 and a distal portion of the rotation shaft 16 are inserted, together with a portion of the brush holder 21, into the holder receptacle 33.

As depicted in FIGS. 1 and 2, screws S fasten the flange 15 of the yoke 13 to the yoke fastening portion 34. The sealing member 22 of the brush holder 21 is held between the yoke fastening portion 34 and the flange 15 in the axial direction. The sealing member 22 seals the open end 14b in the tubular case 14 of the yoke 13 and the open side of the holder receptacle 33 facing the yoke 13. This limits the entrance of liquid into the yoke 13 and the gear housing 31.

The speed reduction mechanism accommodated in the gear housing 31 includes a clutch 35, a worm shaft 36, and a worm wheel 37. The clutch 35 couples the worm shaft 36 to the rotation shaft 16. The worm wheel 37 is engaged with the worm shaft 36. The worm shaft 36 and the worm wheel 37 are rotatable relative to the gear housing 31. An output shaft 38 projects from the worm wheel 37 and out of the gear housing 31. The output shaft 38 is coupled to a window regulator (not shown) that raises and lowers the vehicle window glass. The axis of the worm wheel 37 is orthogonal to the axis of the rotation shaft 16 (yoke 13).

The space available for the motor 10 in a vehicle side door is limited. Thus, the overall size of the motor 10 is reduced (narrowed) in the axial direction of the worm wheel 37.

Figure 3:
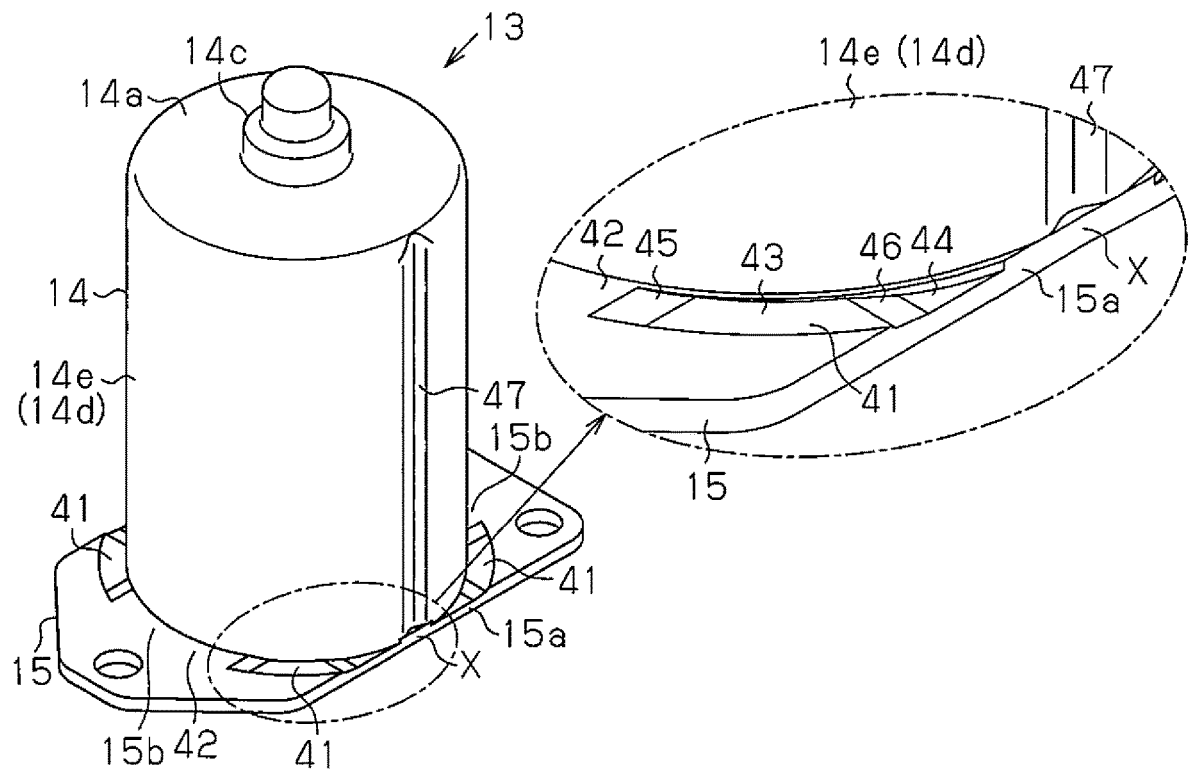
FIG. 3 is a perspective view of a yoke housing shown in FIG. 1.
Figure 4:
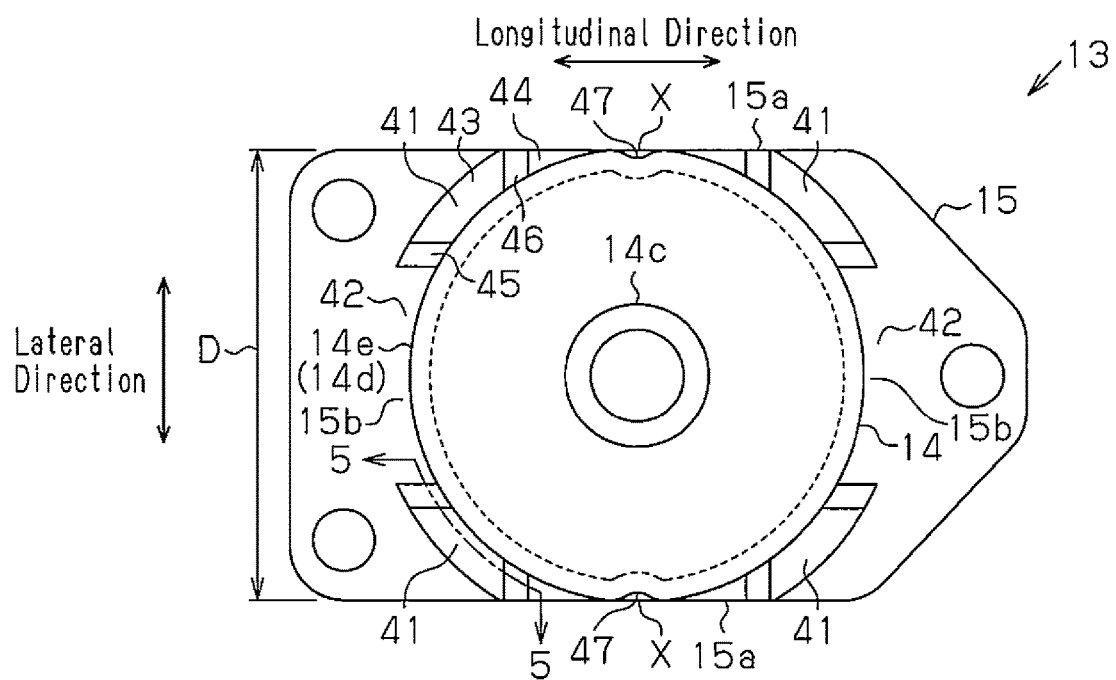
FIG. 4 is a plan view of the yoke housing shown in FIG. 3.

The shape of the yoke 13 will now be described in detail. Referring to FIGS. 3 and 4, a drawing process is performed to form the tubular case 14 from a metal sheet. The flange 15 at the open end 14b is bent at a right angle relative to the outer circumferential wall 14d of the tubular case 14. In this manner, the flange 15 is formed by the portion of the metal sheet excluding the tubular case 14. When viewed from an axial direction of the tubular case 14, the flange 15 has a narrow (generally rectangular) shape to narrow the motor 10. The flange 15 includes long sides extending in a longitudinal direction, short sides extending in a lateral direction, and a thickness in a thickness direction. The lateral direction of the flange 15 is parallel to the axial direction of the worm wheel 37 and orthogonal to the axial direction of the rotation shaft 16. The flange 15 has a width D in the lateral direction that is set to be equal to the outer diameter (diameter) of the tubular case 14.

The flange 15 includes a base 15b located proximal to the outer circumferential surface 14e of the tubular case 14. The base 15b includes beads 41 that are recessed in the surface of the flange 15 near the tubular case 14. The beads 41 are laid out in the upper surface of the flange 15 so as to form four corners that are proximal to the outer circumferential surface 14e of the tubular case 14. In detail, the flange 15 includes overlapping portions X where the outer circumferential surface 14e of the tubular case 14 overlaps with the lateral ends 15a (long sides) of the flange 15. The beads 41 are formed at opposite sides of each overlapping portion X in the longitudinal direction. Each bead 41 is arcuate and extends along the outer circumferential surface 14e of the tubular case 14. Further, each bead 41 is formed by compressing the base 15b of the flange 15 from the upper side in the thickness direction with a pressing jig P (refer to FIG. 7).

In this manner, the beads 41 are formed in portions of the basal surface of the flange 15 proximal to the outer circumferential surface 14e of the tubular case 14. Portions of the flange 15 located between the beads 41 in the lateral direction are thick and define thick portions 42. The tubular case 14 is located between the two thick portions 42 in the longitudinal direction of the flange 15. The two thick portions 42 are located at opposing positions and separated by 180° in the circumferential direction of the tubular case 14. Further, the beads 41 are laid out so that one thick portion 42 is located between two beads 41. The two beads 41 are formed to be symmetrical in shape in the lateral direction of the flange 15.

Figure 5:
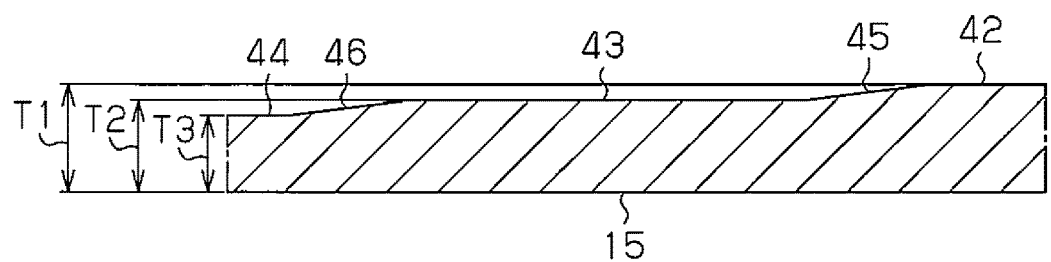
FIG. 5 is a cross-sectional view taken along line 5-5 in FIG. 4.
Figure 6:
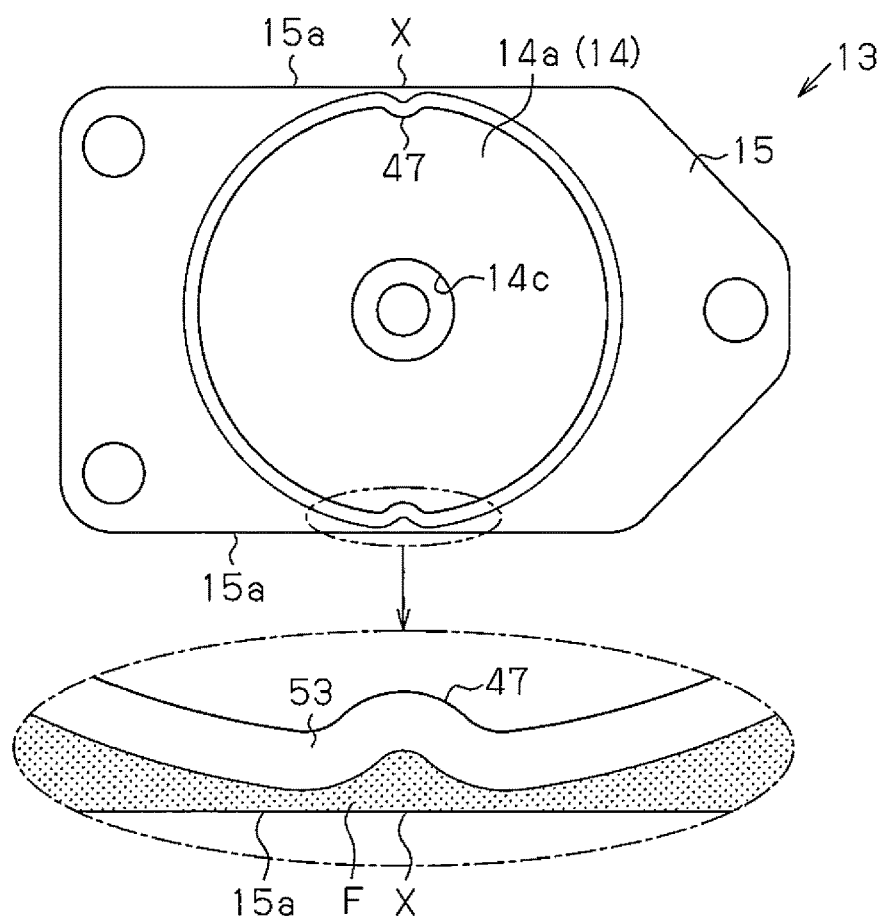
FIG. 6 is a plan view of the yoke housing shown in FIG. 3 taken from the open end in the axial direction.

Each bead 41 includes a first thin portion 43 and a second thin portion 44, which is thinner than the first thin portion 43. More specifically, in the circumferential direction of the tubular case 14, a sloped portion 45 continuously connects the thick portion 42 to the first thin portion 43. A further sloped portion 46 continuously connects the first thin portion 43 to the second thin portion 44. Thus, the thickness T2 of the first thin portion 43 is less than the thickness T1 of the thick portion 42, and the thickness T3 of the second thin portion 44 is less than the thickness T2 of the first thin portion 43 (refer to FIG. 5). In each bead 41, the second thin portion 44 extends to the corresponding lateral end 15a of the flange 15. That is, the second thin portion 44 extends to the proximity of the overlapping portion X of the flange 15 and the tubular case 14. The upper surfaces of the first and second thin portions 43 and 44 are planar and orthogonal to the axial direction.

The outer circumferential surface 14e of the tubular case 14 includes recesses 47 that are inwardly recessed in the radial direction at locations corresponding to the overlapping portions X. Each recess 47 extends straight in the axial direction from the first end (open end 14b) of the tubular case 14 to the second end (end wall 14a) of the tubular case 14. Due to the formation of the recesses 47, the outer diameter of the tubular case 14 is slightly decreased between the two lateral ends (upper and lower ends as viewed in FIG. 4) of the flange 15. This contributes to reducing the size of the tubular case 14.

The manufacturing method and operation of the yoke 13 will now be described. Referring to sections (a) and (b) of FIG. 7, a multistage drawing process is performed to form the tubular case 14 from a metal sheet 51 (drawing step). In this step, the recesses 47 are formed in the outer circumferential surface of the tubular case 14. The drawing process generates residual stress in the metal sheet 51.

Then, referring to section (c) of FIG. 7, the pressing jig P is used to compress predetermined locations of a flat portion 52, which subsequently forms the flange 15 and which is orthogonal to the tubular case 14. This forms the beads 41 (bead formation step). In detail, the base 15b, which is proximal to the tubular case 14 in the flat portion 52, is compressed by the pressing jig P in the thickness direction to form the beads 41. Here, the second thin portions 44 of the beads 41 located at opposite sides of each recess 47 are continuously connected in the circumferential direction at the radially outer side of the recess 47. Further, the portions in the base 15b of the flange 15 that are free from the beads 41 define the thick portions 42.

Figure 8:
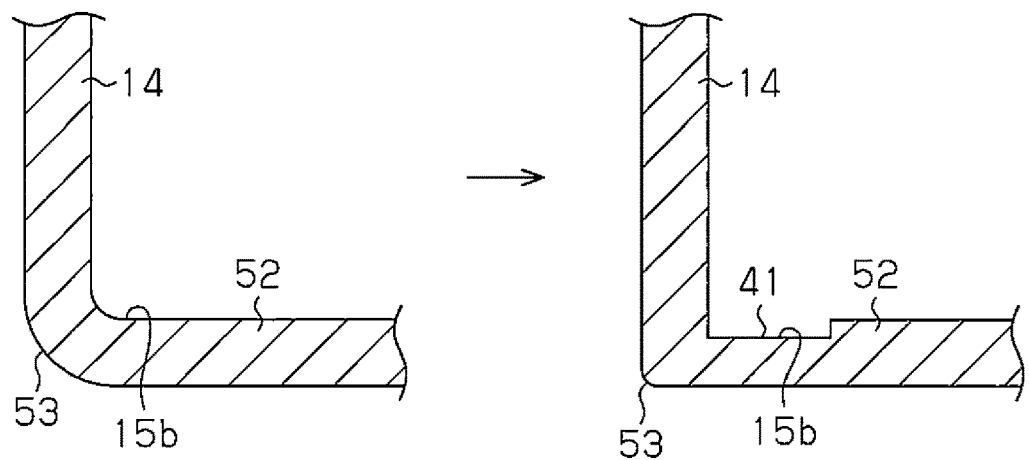
FIG. 8 is a schematic diagram illustrating the manufacturing process of the yoke housing shown in FIG. 3.

Referring to FIG. 8, when compressing the base 15b in the flat portion 52 to form the beads 41, the thickness of the metal sheet 51 is decreased at the corner between the flat portion 52 and the tubular case 14. This decreases the curvature of an inner corner 53 formed between the lower surface of the flat portion 52 and the inner circumferential surface of the tubular case 14 at the lower side, or rear side, of the beads 41. Further, an increase in the depth of the beads 41, that is, an increase in the compressed amount, decreases the curvature of the inner corner 53. In other words, the curvature of the inner corner 53 is maximal at the lower side of each thick portion 42 where the beads 41 are not formed, and the curvature of the inner corner 53 is minimal at the lower side of each second thin portion 44 where the compressed amount is large.

Figure 7:
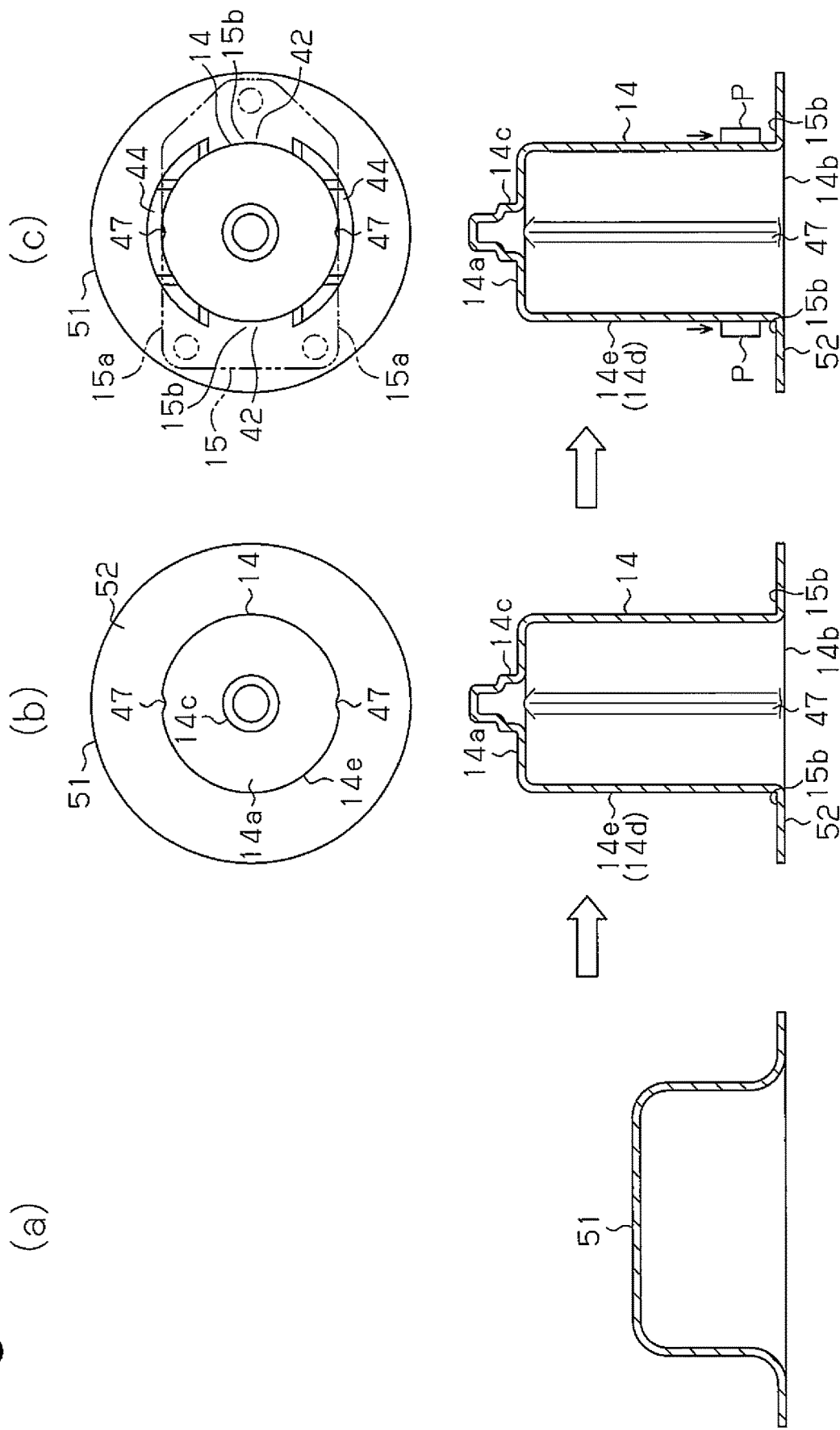
FIG. 7 is a schematic diagram illustrating a manufacturing process of the yoke housing shown in FIG. 3.

Then, referring to section (c) of FIG. 7, the flange 15 is pressed out of the flat portion 52 (flange pressing step). The flange 15 has a width D in the lateral direction that is set to be equal to the outer diameter (diameter) of the tubular case 14. Thus, the interval in the lateral direction of the flange 15 is null or extremely small between the outer circumferential surface 14e of the tubular case 14 and the edge of the flange 15 (lateral end 15a). Thus, when pressing the flange 15, the residual stress generated during the drawing process is apt to act in the lateral direction in which the flange 15 does not extend. In the present embodiment, the beads 41 act to receive the residual stress. This limits widening of the open end 14b of the tubular case 14 in the lateral direction of the flange 15.

If the flange 15 were to be pressed without forming the beads 41, the inner corner 53 would have a large curvature. As a result, the contact plane (plane orthogonal to axial direction) between the flange 15 and the sealing member 22 at each overlapping portion X would have an extremely small width. This adversely affects the adhesion (seal) of the sealing member 22 at each overlapping portion X, and may cause liquid to enter the yoke 13 from such locations.

In the present embodiment, the second thin portion 44 is formed in the flat portion 52 at a location corresponding to each overlapping portion X before the flange 15 is pressed out. This decreases the curvature of the inner corner 53 at each overlapping portion X. Thus, a contact plane F that contacts the sealing member 22 has a width in the radial direction at each overlapping portion X.

Further, in the present embodiment, the recesses 47 are formed in the outer circumferential surface 14e of the tubular case 14 at locations corresponding to the overlapping portions X. Thus, a portion of the outer circumferential wall 14d is hollowed toward the inner side in the radial direction at the lower axial end (end near open end 14b) of each recess 47. This ensures that the contact plane F, which contacts the sealing member 22, has a further sufficient width in the radial direction at each overlapping portion X.

Further, in the present embodiment, the thick portions 42 are formed at portions where the beads 41 are not formed in the base 15b of the flange 15 located proximal to the outer circumferential surface 14e of the tubular case 14. This limits deformation of the flange 15 at the thin beads 41 when load is applied to the flange 15 in the thicknesswise direction such as when fastening the flange 15 with the screws S.

The curvature of the inner corner 53 may be decreased by reducing the thickness of the beads 41. However, when the beads 41 are too thin, the flange 15 would become brittle with respect to load acting in the thickness direction. Accordingly, in the present embodiment, each bead 41 includes first and second thin portions 43 and 44 having different thicknesses. This minimizes reduction in the rigidity that counters loads applied to the flange 15 in the thickness direction. Further, the formation of the second thin portion 44 ensures that the contact plane F, which contacts the sealing member 22, has a further a sufficient width.

The described embodiment has the advantages described below:

(1) The flange 15 includes the base 15b located proximal to the outer circumferential surface 14e of the tubular case 14. On each side of the tubular case 14, the base 15b includes two beads 41 and a thick portion 42. Each bead 41 is formed by compressing the base 15b in the thicknesswise direction. The thick portion 42 is formed in the base 15b at a location where the beads 41 are not formed. The thick portion 42 is located at the laterally middle portion of the flange 15. The two beads 41 are located on opposite sides of the thick portion 42 in the lateral direction. In this structure, the beads 41 formed in the base 15b of the flange 15 receive the residual stress generated during the drawing process. This limits deformation that widens the open end 14b of the tubular case 14 in the lateral direction of the flange 15. Further, the beads 41 are not formed throughout the entire base 15b in the circumferential direction. The remaining laterally middle portion of the base 15b forms the thick portion 42. This limits bending at the beads 41, which are thin, when receiving load in a thicknesswise direction of the flange 15.

(2) Each bead 41 extends to the corresponding lateral end of the flange 15. That is, each bead 41 extends to the overlapping portion X where the outer circumferential surface 14e of the tubular case 14 overlaps with the edge (lateral end 15a) of the flange 15. This allows the curvature of the inner corner 53, which is formed by the lower surface of the flange 15 and the inner circumferential surface of the tubular case 14, to be decreased at the overlapping portion X. As a result, when sealing the open end 14b of the tubular case 14, the contact plane F, which contacts the sealing member 22, has a sufficient width in the radial direction. This improves the seal.

(3) The lateral end 15a of the flange 15 includes the overlapping portion X that is overlapped with the outer circumferential surface 14e of the tubular case 14. Each bead 41 includes the first thin portion 43 and the second thin portion 44, which is thinner than the first thin portion 43. The second thin portion 44 is located in the overlapping portion X. In this structure, the second thin portion 44 is formed at a location corresponding to the overlapping portion X without excessively decreasing the thickness of the entire bead 41. This minimizes reduction in the rigidity that counters the load acting in the thicknesswise direction of the flange 15, and ensures a sufficient width in the radial direction for the contact plane F, which contacts the sealing member 22.

(4) The recess 47, which is hollowed toward the inner side in the radial direction, is formed at a location corresponding to the overlapping portion X in the outer circumferential surface 14e of the tubular case 14. In this structure, the outer circumferential wall 14d of the tubular case 14 is recessed toward the inner side in the radial direction at the overlapping portion X. This ensures a further sufficient width in the radial direction for the contact plane F, which contacts the sealing member 22.

(5) The flange pressing step, which presses the flange 15 out of the flat portion 52, is performed after the bead formation step, which forms the beads 41. This allows the beads 41 to receive the residual stress generated during the drawing process in a further suitable manner. As a result, deformation that widens the open end 14b of the tubular case 14 in the lateral direction of the flange 15 is further effectively limited.

It should be apparent to those skilled in the art that the present invention may be embodied in many other specific forms without departing from the spirit or scope of the invention. Particularly, it should be understood that the present invention may be embodied in the following forms.

Figure 9:
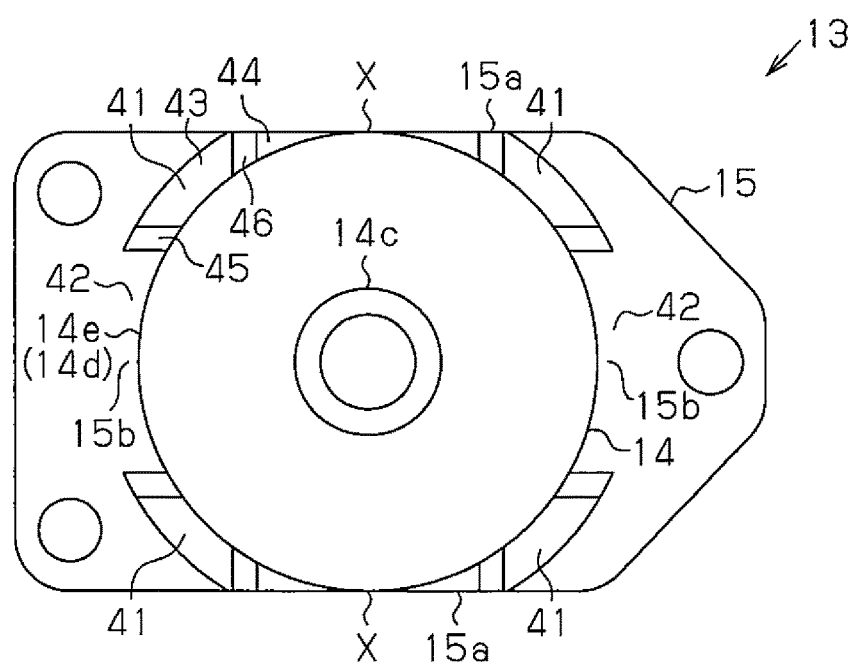
FIG. 9 is a plan view showing a yoke housing of another example.
Figure 10:
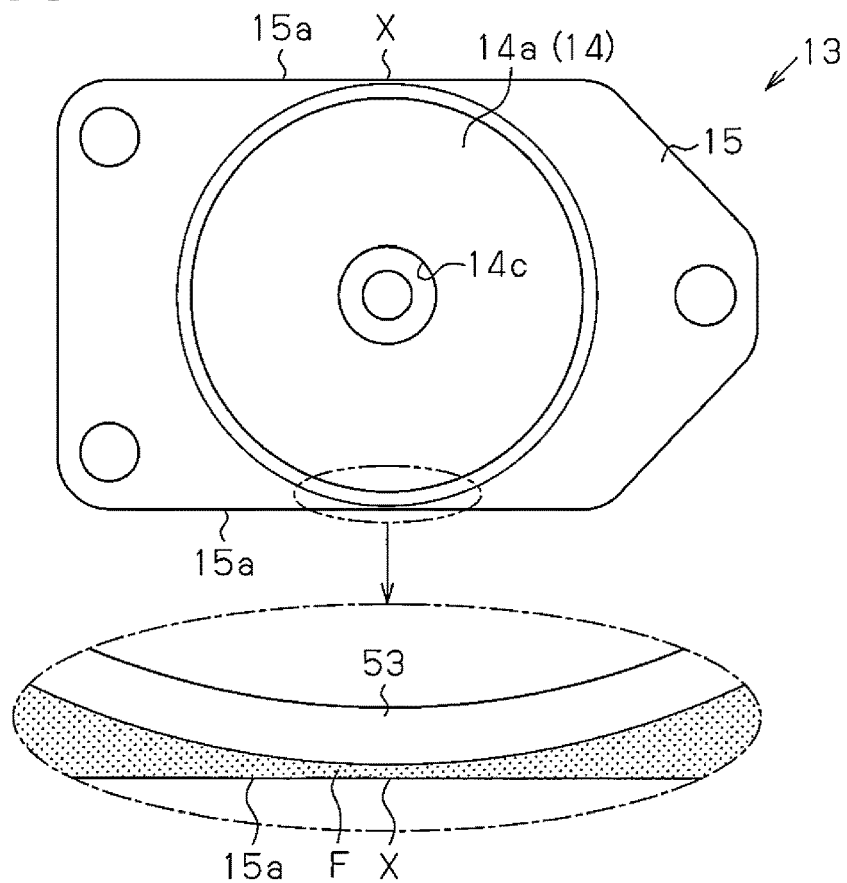
FIG. 10 is a plan view of the yoke housing shown in FIG. 9 taken from the open end in the axial direction.
Figure 11A:
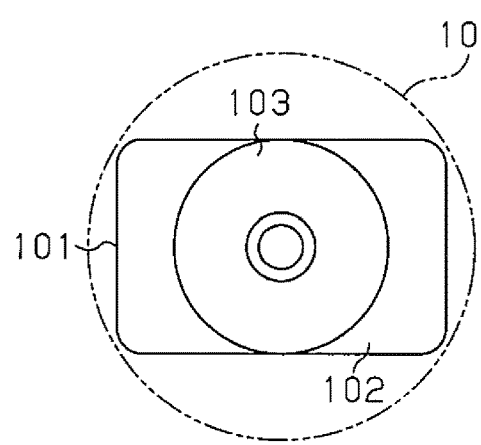
FIGS. 11A and 11B are schematic diagrams showing one example of a conventional yoke housing.
Figure 11B:
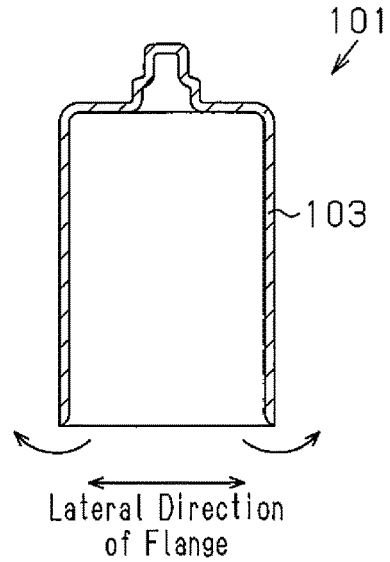

In the above embodiment, the recesses 47 are formed in the outer circumferential wall 14d of the tubular case 14. Instead, for example, as depicted in FIGS. 9 and 10, the recesses 47 may be omitted from the structure of the above embodiment. In this structure, since the recesses 47 of the above embodiment are not formed, the radial width of the contact plane F where the flange 15 contacts the sealing member 22 at each overlapping portion X is less than that of the above embodiment. However, the bead 41 (specifically, the second thin portion 44), which is formed at a location corresponding to each overlapping portion, decreases the curvature of the inner corner 53 at the overlapping portion X. This obtains a radial width for the contact plane F at the overlapping portion X even when the recess 47 is not formed. The formation of the recesses 47 would further effectively obtain the radial width.

The beads 41 are not limited to the shape and structure of the above embodiment and may be changed as required. For example, in the above embodiment, each bead 41 has a stepped shape including first and second thin portions 43 and 44 that have different thicknesses. Instead, the thickness may be uniform throughout the entire bead 41.

For example, in the above embodiment, each bead 41 extends to the corresponding lateral end 15a of the flange 15 and is formed at a location corresponding to the overlapping portion X. However, each bead 41 does not necessarily have to extend to the lateral end 15a of the flange 15.

Further, for example, in the above embodiment, the beads 41 are formed in the upper side (side of the tubular case 14) of the flange 15. Instead, the beads 41 may be formed in the lower side of the flange 15.

In the above embodiment, the flange pressing step that presses the flange 15 out of the flat portion 52 is performed after the bead formation step that forms the beads 41. Instead, the bead formation step may be performed after the flange pressing step. This would also obtain substantially the same advantages as the above embodiment.

In the above embodiment, the present invention is embodied in the motor 10, which serves as a drive source for a power window device. However, the present invention may be embodied in a motor serving as a drive source for another device.

The present examples and embodiments are to be considered as illustrative and not restrictive, and the invention is not to be limited to the details given herein, but may be modified within the scope and equivalence of the appended claims.

The invention claimed is:

1. A method for manufacturing a yoke housing including a tubular case and a flange, wherein the tubular case includes a first end in an axial direction, the flange is formed on the first end and bent from the tubular case, the method comprising:
   forming the tubular case and a flat portion from a metal sheet by performing a drawing process, wherein the flat portion is formed on the first end and bent from the tubular case, and the flat portion includes a base located proximal to an outer circumferential surface of the tubular case;
   forming thin beads in the base by compressing portions of the base after forming the tubular case; and
   pressing out the flange from the flat portion so that the flange has a narrow shape and extends in a longitudinal direction and a lateral direction, wherein the flange has a width in the lateral direction that is equal to an outer diameter of the tubular case,
   wherein a portion of the base in which the beads are not formed defines a thick portion that is thicker than the beads, the thick portion is located at a middle portion of the flange in the lateral direction, and the beads are located on opposite sides of the thick portion in the lateral direction.

* * * * *